Patented Nov. 21, 1922.

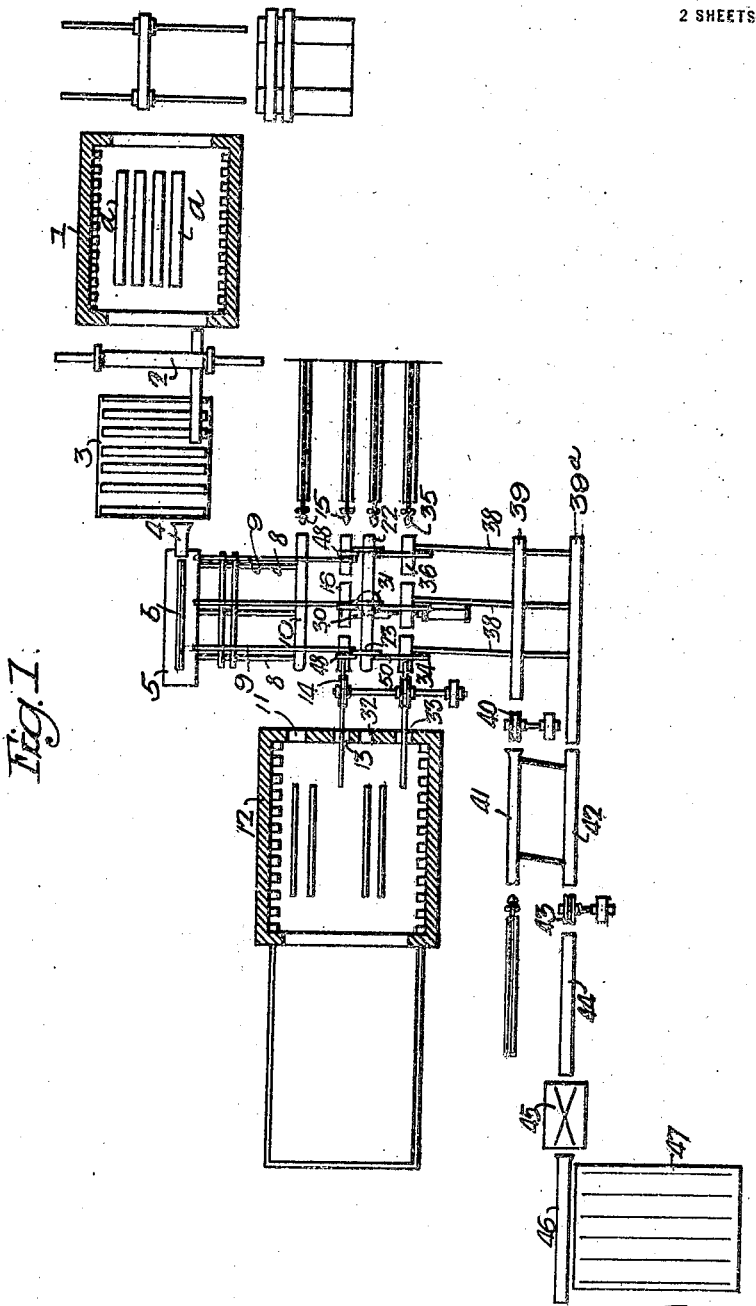

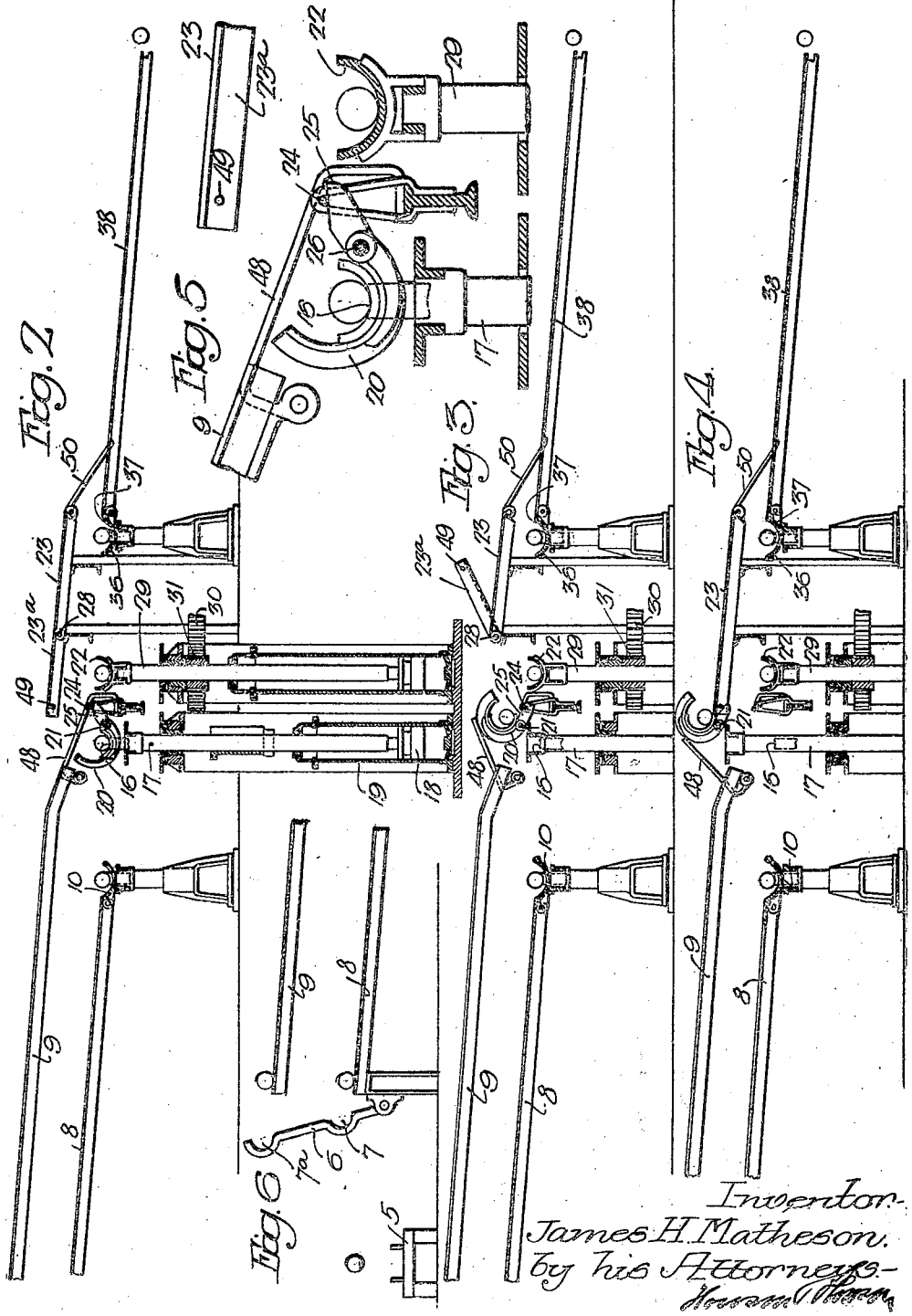

1,436,514

UNITED STATES PATENT OFFICE.

JAMES H. MATHESON, OF READING, PENNSYLVANIA.

APPARATUS FOR MAKING LAPWELDED TUBES.

Application filed September 22, 1921. Serial No. 502,460.

*To all whom it may concern:*

Be it known that I, JAMES H. MATHESON, a citizen of the United States, residing in Reading, Berks County, Pennsylvania, have invented certain Improvements in Apparatus for Making Lapwelded Tubes, of which the following is a specification.

One object of my present invention is to provide means for making a double weld tube, or pipe, or to provide means whereby a single weld pipe can be made and in which run-overs can be rewelded to correct defects.

This object I attain in the following manner, reference being had to the accompanying drawings, in which:

Fig. 1 is a plan view of my improved apparatus for making lap-welded tubes or pipes;

Fig. 2 is a transverse sectional view showing the parts in position to make a double weld tube on a single weld pipe, or to reweld defective tubes;

Fig. 3 is a transverse sectional view showing a tube in the act of being transferred from one trough to another;

Fig. 4 is a view showing the welded pipe being transferred onto the inclined ways to roll clear of the other troughs;

Fig. 5 is an enlarged view of part of Fig. 2; and

Fig. 6 is a view of a transfer device.

Referring to Fig. 1, 1 is a primary heating furnace for the plates $a$, which are passed into the rear of the furnace and then projected from the front thereof through scarfing rolls 2 and onto a table 3. This furnace is of the usual regenerative construction used in tube mills.

The plates pass through bending dies 4 from the table 3 and these dies shape the plates into the form of tube skelps $b$ with the scarfed edges overlapping. After the tube skelps pass through the bending dies, they are supported by a table 5 and from this table they are rolled onto a pivoted transfer device 6 (Fig. 6) and dropped into the recess 7 or 7$^a$ of said transfer device. This transfer device, when raised, delivers the tubes onto the inclined ways 8 or 9. At the lower end of the inclined way 8 is a trough 10 into which the skelp rolls and this trough is opposite the opening 11 in the front of the heating furnace 12, which is also of the usual regenerative type.

The tube skelps are heated to the proper degree in this furnace. The furnace in the present instance is so designed that several skelps can remain in the furnace until they are heated to the proper degree. They are then passed out through the opening 13 in the front of the furnace and between welding rolls 14 and over balls 15 which are projected so as to be in proper position in respect to the welding rolls. The welded tubes pass into the trough 16 directly back of the rolls and this trough is carried by a plunger 17 having a piston 18 therein adapted to a hydraulic, steam, or air cylinder 19 so that by operating suitable valves, not shown, the trough can be raised with the tube.

20 is a discharging device pivoted at 21 and is arranged to discharge the tube either into the next trough 22 or onto an inclined way 23. This is controlled by a pin 24. When this pin is in place as in Figs. 3 and 5, then the moment the plunger is raised the heel 25 of the device 20 will strike the pin 24 and the discharge device will turn on its pivot 26 carrying with it the tube which will roll from the discharge device into the trough 22.

The section 23$^a$ of the inclined way 23 which is directly above the trough 22, is pivoted at 28 so as to be thrown back as shown in full lines in Fig. 3 to allow a plunger 29 carrying the trough 22 to be raised and turned in the ordinary manner by means of a rack 30 engaging a pinion 31 on the plunger 29. The object of turning the trough with the tube in it is to reverse the direction of movement of the tube through the second welding rolls after being reheated. After the trough has been turned, the tube is projected from the trough into the furnace 12 through the opening 32 and, after being reheated, is passed through the opening 33, through the welding rolls 34, over the ball 35, and onto the trough 36. This trough has pivoted discharging devices 37, which can be operated by hand, or by power. The finished tube is then discharged onto the inclined way 38 to a trough 39 in front of the finishing rolls 40. After the tube passes through the finishing rolls, it is supported by a trough 41 and is carried laterally over ways to a trough 42 in the front of a pair of sizing rolls 43. After the tube passes between these rolls onto a trough 44, it is passed through the ordinary cross rolls 45 to a trough 46 and then onto a cooling table 47. In some instances, the tube can be discharged onto a trough 39$^a$ and then passed through the sizing rolls, when it is desired to omit the finishing process.

The above description refers to the process of making a double weld tube. When it is desired to make a single weld pipe, for instance, the skelp is discharged onto the inclined way 9, and the pivoted bars 48 carry the skelp over the trough 16 and discharge the skelp onto the trough 22. The skelp is then passed into the furnace 12 and heated to the proper degree and discharged through the opening 33 and passed between the welding rolls 34 onto the trough 36 and through the several devices hereinbefore described for finishing and straightening the tubes. The single weld can also be made of a skelp by passing it down the inclined way 8 to the trough 10, then into the furnace and out between the welding rolls 14 onto the trough 16. Then, by removing the pin 24 and raising the plunger 17, the discharge device 20 will elevate the pipe until its heel 25 strikes a pin 49 on the inclined way 23, as shown in Fig. 4, causing the discharge device to discharge the pipe onto the inclined way 23. The pipe rolls down this inclined way and down the pivoted inclined guides 50 to the inclined way 38. The guides 50 are pivoted at the ends of the inclined way 23 so that, when a tube, or pipe, passes from the trough 36, it lifts these guides 50 in its passage to the trough 39, or 39$^a$.

When it is desired to reweld a tube case, runovers, or defective tubes can be placed on the ways 9 and fed to the charging trough 22, during the process of double welding tubes, or pipes.

The tube, or pipe, is then projected from the trough into the furnace 12 through the opening 32. After being reheated, it is passed through either of the openings 13 or 33 and between the welding rolls and then through the several devices already described for finishing and straightening.

I claim:

1. The combination in apparatus for welding tubes for pipes of a furnace having two charging openings; two withdrawal openings alternating with the charging openings and at one end of the furnace; troughs in line with the several openings; welding rolls between the withdrawal openings and the troughs; inclined ways for directing the tube skelp either to the trough opposite the first charging opening or to the trough opposite the second charging opening; inclined ways above the trough opposite the second charging opening and second withdrawal opening; and means for discharging a tube from the trough opposite the first withdrawal opening onto the trough opposite the second charging opening or onto the inclined way above said troughs.

2. The combination in apparatus for making lap-welded tubes of a furnace; a series of troughs in front of the furnace; two charging openings and two withdrawal openings, said withdrawal openings alternating with the charging openings and located at one end of the furnace; welding rolls in line with the withdrawal openings; two inclined ways one above the other, one leading to the trough in front of the first charging opening and the other leading to the trough in front of the second charging opening; a pivoted guide carrying the tube from the upper inclined into the second charging opening; a plunger carrying the trough opposite the first withdrawal opening; a pivoted discharging device for discharging the tube either onto the trough opposite the second charging opening or onto an inclined way above said trough, said discharging device having a heel; a pin on the fixed part of the frame arranged to be engaged by the heel when the plunger is raised; and a second pin arranged to engage the heel when the first pin is withdrawn so that the tube will be discharged either onto the trough or onto the inclined way.

3. The combination in apparatus for making lap-welded tubes or pipe of a heating furnace having two charging openings and two withdrawal openings at one end of the furnace, the withdrawal openings alternating with the charging openings; troughs opposite the several openings; welding rolls opposite the withdrawal openings; inclined guideways one above the other, one guideway leading to the trough opposite the first charging opening the other leading to the trough opposite the second charging opening; means carried by the trough opposite the first withdrawal opening for delivering the tube either to the trough opposite the second charging opening or to an inclined way above said trough, said inclined way having a pivoted section which can be thrown back when it is desired to raise the trough opposite the second charging opening for the purpose of turning the tube prior to passing it into the furnace to receive a second weld.

JAMES H. MATHESON.